United States Patent [19]
Chen

[11] Patent Number: 5,563,767
[45] Date of Patent: Oct. 8, 1996

[54] DRAWER TYPE HARD DISKDRIVE ADAPTER

[76] Inventor: Teng-Chun Chen, 1F. No. 4, Alley 30, Lane 281, Fu-Teh 1st Road, HsiChih, Taipei, Taiwan

[21] Appl. No.: 434,722
[22] Filed: May 4, 1995
[51] Int. Cl.⁶ ....................................... H05K 7/10
[52] U.S. Cl. .................. 361/685; 361/683; 439/928.1; 364/708.1
[58] Field of Search ................................. 361/683, 685; 439/928.1; 364/708.1

[56] References Cited

U.S. PATENT DOCUMENTS

4,941,841  7/1990  Darden et al. ................... 361/685
5,442,513  8/1995  Lo ...................................... 361/685

Primary Examiner—Leo P. Picard
Assistant Examiner—Jayprakash N. Gandhi
Attorney, Agent, or Firm—Donald C. Casey

[57] ABSTRACT

A drawer type hard diskdrive adapter including a mounting frame fastened to the computer mainframe, a casing covered with a top cover and moved in and out of the mounting frame to carry a hard diskdrive, the top cover having a hook hooked on a spring-supported sliding block in a sliding track at one side of the casing, and two projecting rods fitted into respective trapezoidal openings on the front side of the casing, the casing having a pivoted handle at the front side, which forces the projecting rods of the top cover out of the trapezoidal openings when it is turned upwards through 90° angle, causing the casing separated from the mounting frame for loading or unloading the hard diskdrive.

5 Claims, 8 Drawing Sheets

Fig1

PRIOR ART

DRAWER TYPE HARD DISKDRIVE ADAPTER

BACKGROUND OF THE INVENTION

The present invention relates to a drawer type hard diskdrive adapter for loading a replaceable hard diskdrive in the mainframe of a computer system conveniently.

Figure 1:
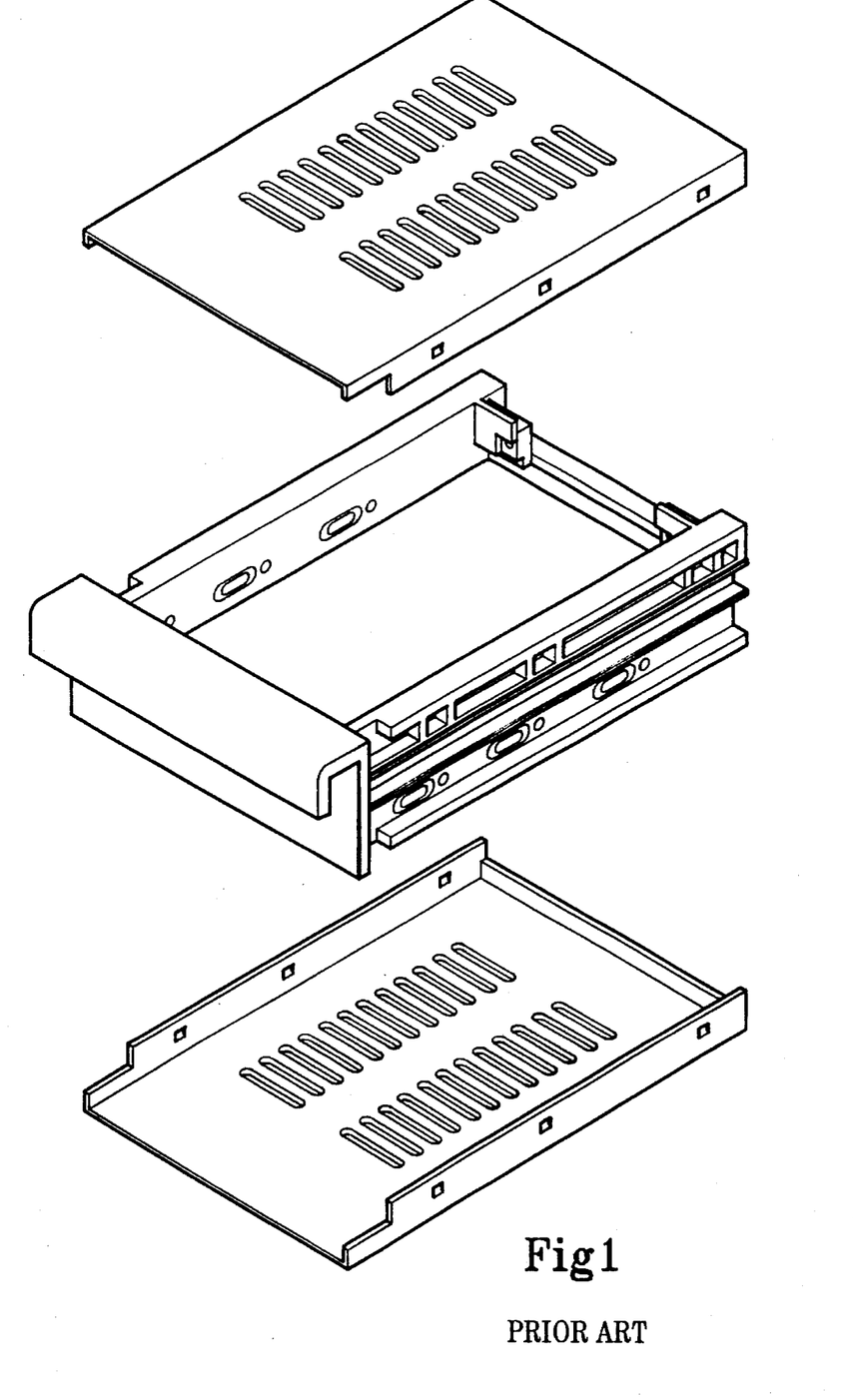
FIG. 1 is an exploded view of a drawer type hard diskdrive adapter according to the prior art.

Various drawer types hard diskdrive adapters are known and intensively used for loading a hard diskdrive in the mainframe of a computer system. These diskdrive adapters, as shown in FIG. 1, permits the hard diskdrive to be conveniently loaded in the computer mainframe. However, when to move these diskdrive adapters out of the computer mainframe, much effort must be used, and the contact pins of the electric connectors may be damaged if applied force is not evenly distributed through the adapters.

SUMMARY OF THE INVENTION

The present invention has been accomplished to provide a drawer type hard diskdrive adapter which eliminates the aforesaid problem. According to the preferred embodiment of the present invention, the drawer type hard diskdrive adapter comprises a mounting frame fastened to the computer mainframe, a casing covered with a top cover and moved in and out of the mounting frame to carry a hard diskdrive, the top cover having a hook hooked on a spring-supported sliding block in a sliding track at one side of the casing, and two projecting rods fitted into respective trapezoidal openings on the front side of the casing, the casing having a pivoted handle at the front side, which forces the projecting rods of the top cover out of the trapezoidal openings when it is turned upwards through 90° angle, causing the casing separated from the mounting frame for loading or unloading the hard diskdrive.

DETAILED DESCRIPTION OF THE PREFERRED EMBODIMENT

Figure 2:
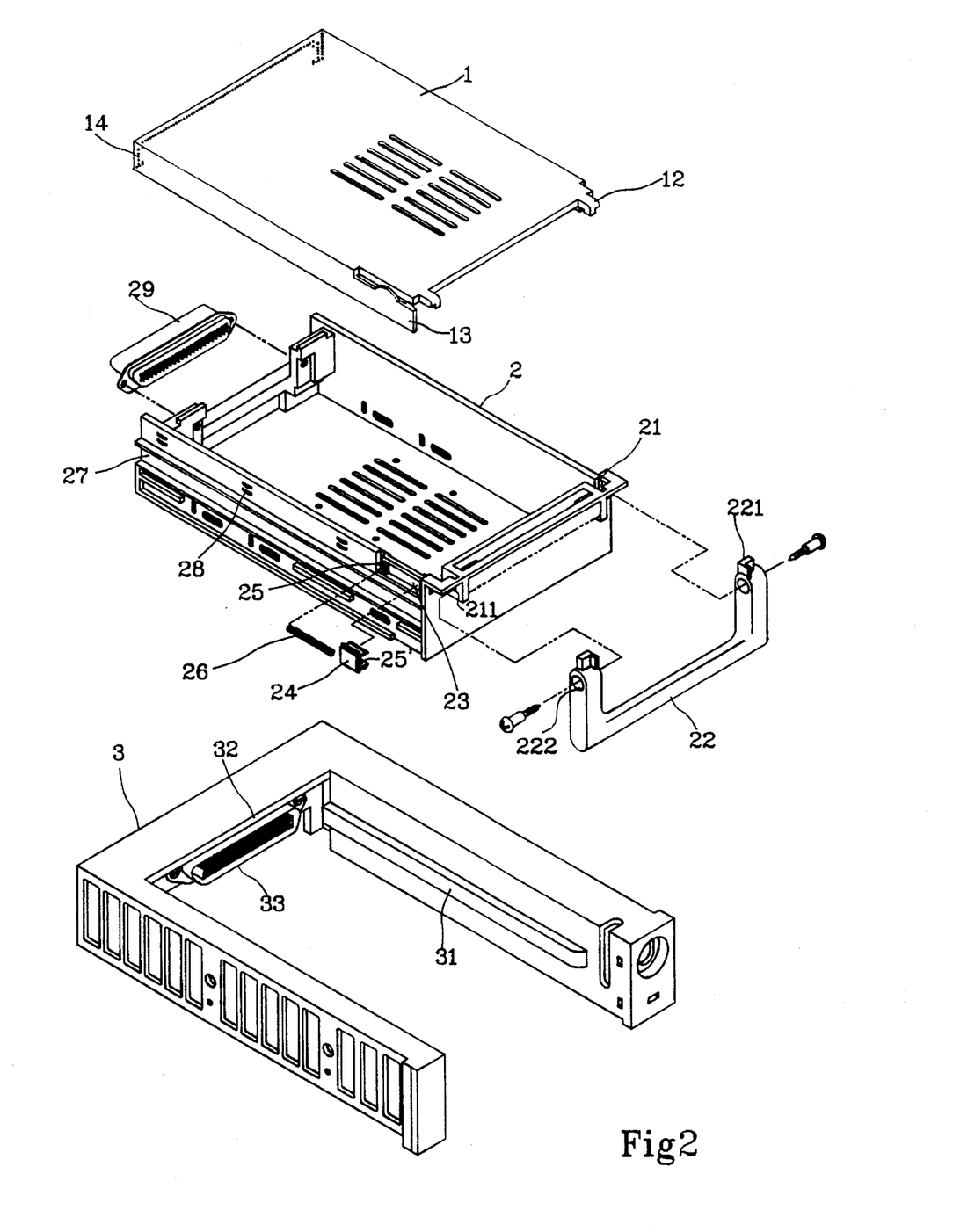
FIG. 2 is an exploded view of a drawer type hard diskdrive adapter according to the present invention.

Referring to FIG. 2, a drawer type hard diskdrive adapter in accordance with the present invention is generally comprised of a top cover 1, a casing 2, and a mounting frame 3.

The top cover 1 is made of rectangular shape having two projecting rods 12 bilaterally extended from the front side of the top wall thereof, a front hook 13 extended from one side wall thereof, and two sliding grooves 14 bilaterally disposed on the inside.

The casing 2 is made of hollow rectangular shape having two symmetrical trapezoidal openings 21 at the front side, two transverse screw holes 211 respectively disposed adjacent to the trapezoidal openings 21, a handle 22 pivotably connected to the screw holes 211, a track 23 at one lateral side near the front side, a sliding block 24 moved in the track 23, a spring 26 connected between a locating rod 25 on the track 23 and a locating rod 25 on the sliding block 24, two longitudinal grooves 27 on the two opposite lateral sides, a plurality of raised portions 28 on the two opposite lateral sides above the longitudinal grooves 27, and an electric connector 29 at the rear side. The handle 22 has two through holes 222 near two opposite ends thereof respectively connected to the screw holes 211 by a respective screw bolt, and two projecting blocks 221 moved relative to the trapezoidal openings 21 to confine circular movement of the handle 2 within 90° angle.

The mounting frame 3 is made of substantially U-shaped configuration having two longitudinal rails 31 bilaterally disposed on the inside and an electric connector 33 at the closed rear side thereof.

Figure 3:
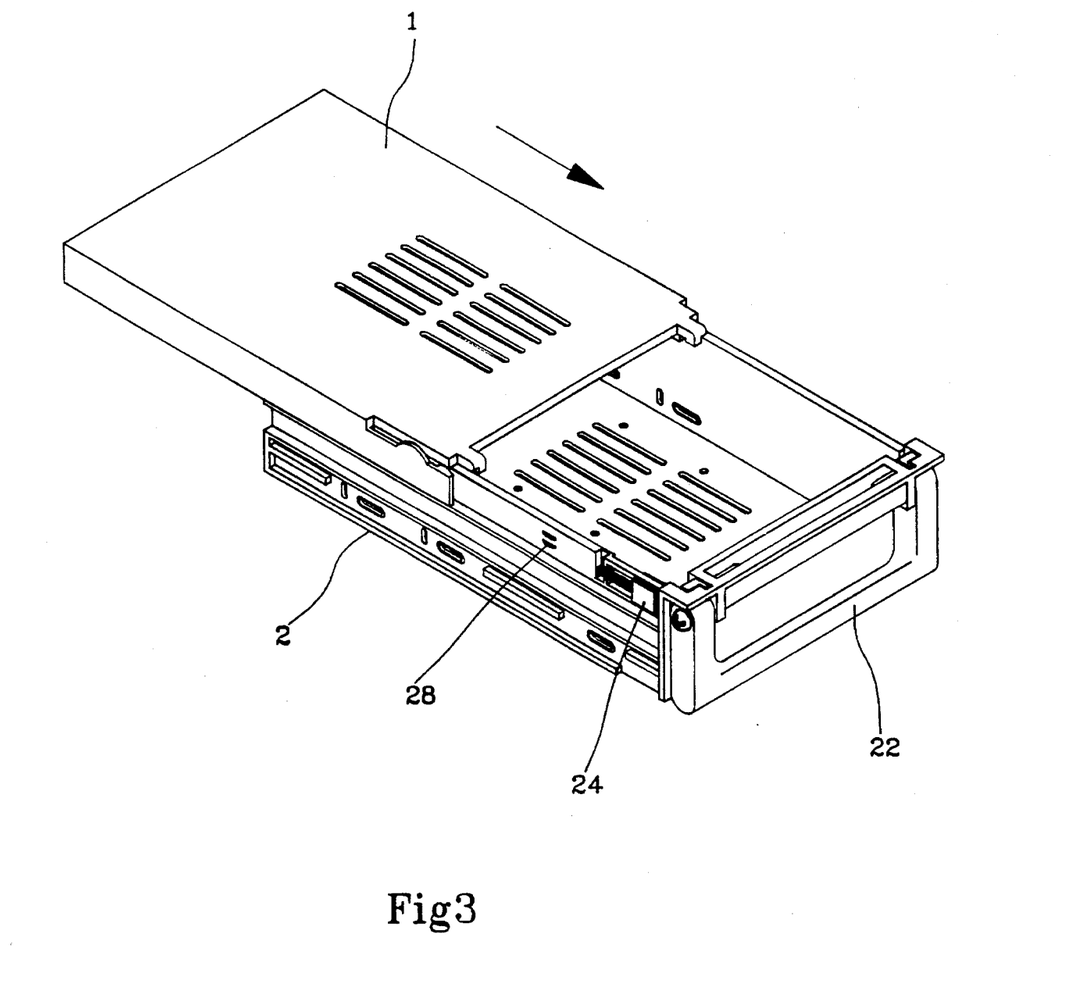
FIG. 3 is an assembly view of the present invention showing the top cover fastened to the casing.
Figure 4:
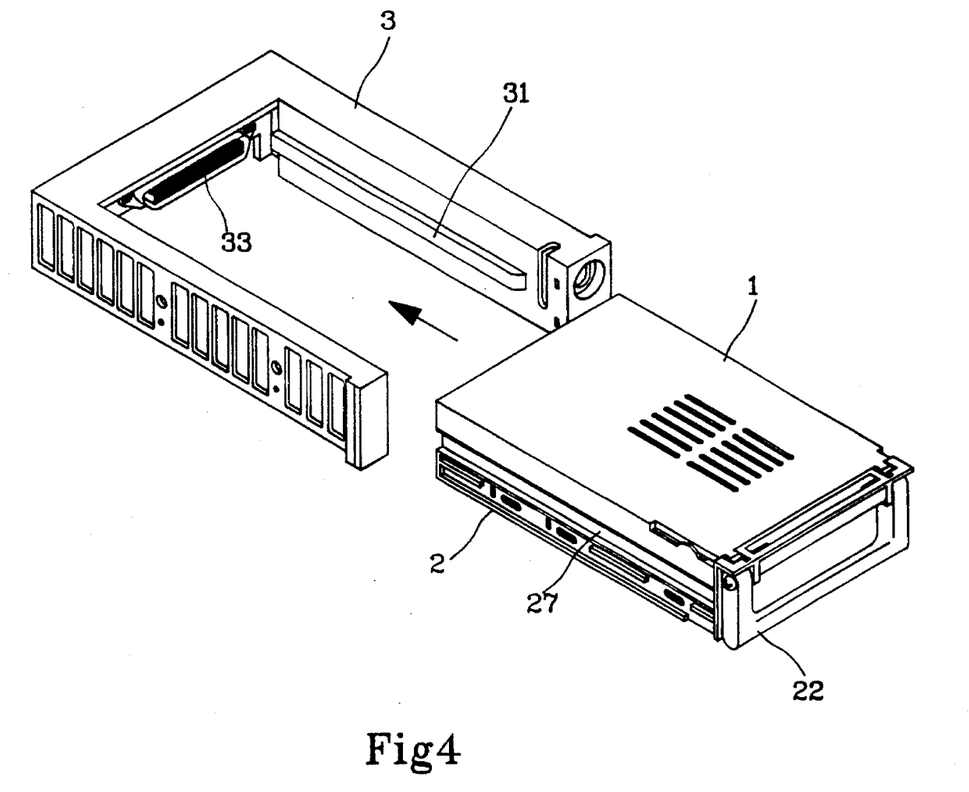
FIG. 4 is another assembly view of the present invention, showing the casing with the top cover fastened to the mounting frame.
Figure 5:
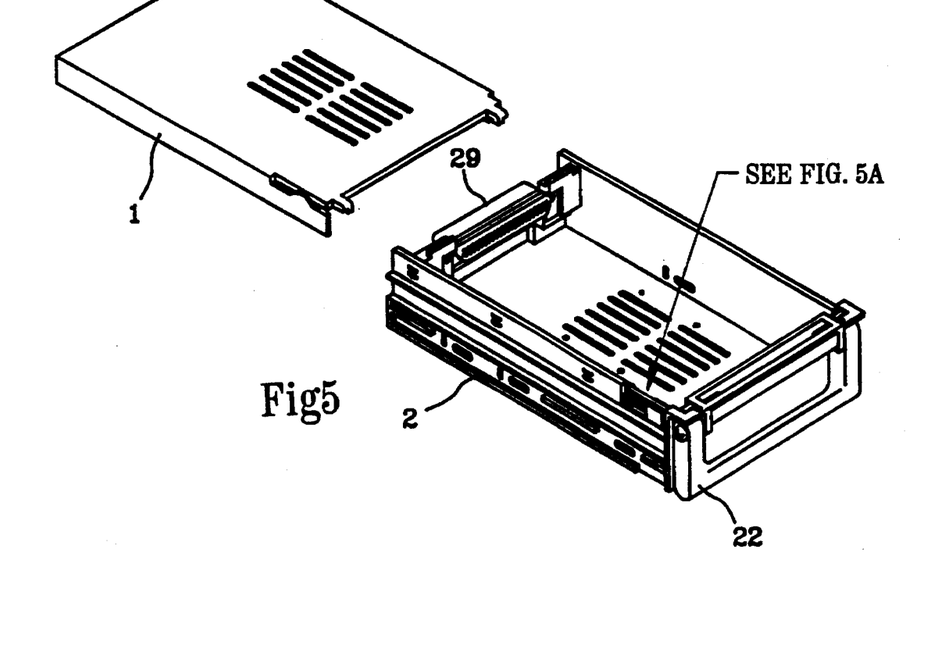
FIG. 5 is a partial view in an enlarged scale taken on part of the casing, showing the installation of the spring and the sliding block according to the present invention.
Figure 5A:
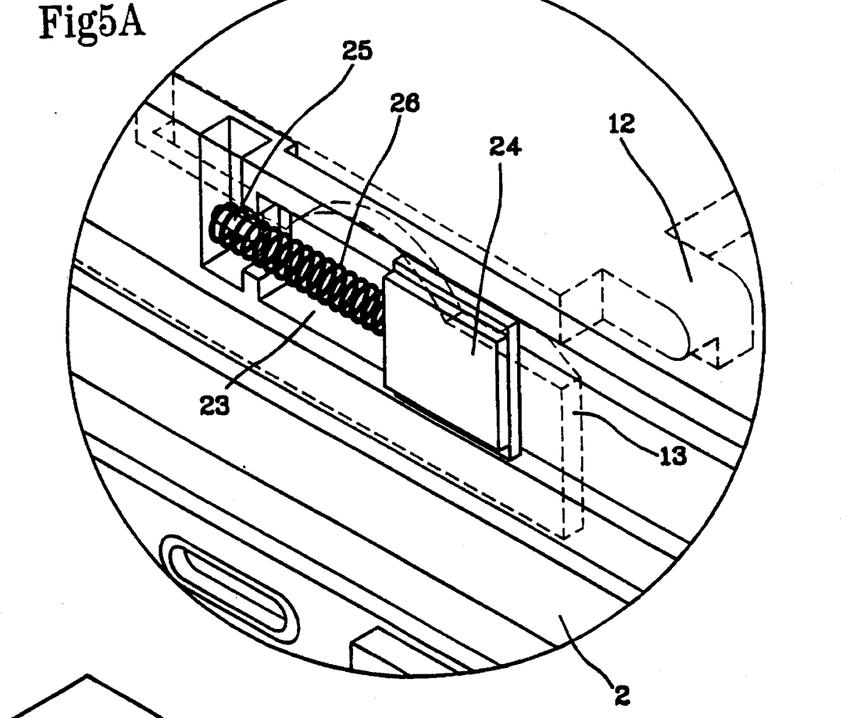

Referring to FIGS. 3 and 4, the top cover 1 is fastened to the casing 2 and covered on the top open side of the casing 2 by matching the sliding grooves 14 of the top cover 1 with the raised portions 28 of the casing 2 and inserting the projecting rods 12 of the top cover 1 into the front openings 21 of the casing 2, permitting the front hook 13 of the top cover 1 to be hooked on the sliding block 24. When the top cover 1 and the casing 2 are fastened together, the casing 2 is fastened to the mounting frame 3 by inserting the longitudinal rails 31 of the mounting frame 3 into the longitudinal grooves 27 on the casing 2. When the casing 2 is fastened to the mounting frame 3, the electric connectors 29 and 32 are connected together.

Figure 6:
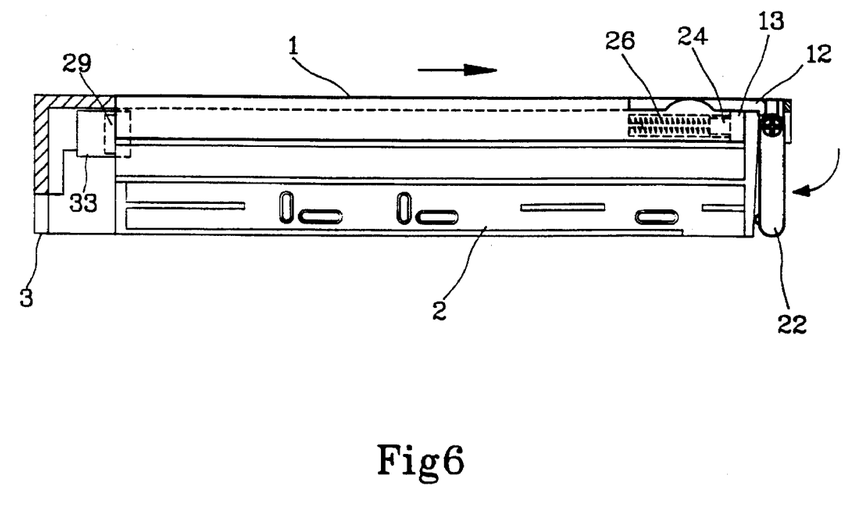
FIG. 6 is a side plain view of the casing and the top cover according to the present invention, showing the handle disposed in the vertical position and the projecting rods of the top cover fitted into the trapezoidal front openings on the casing.
Figure 7:
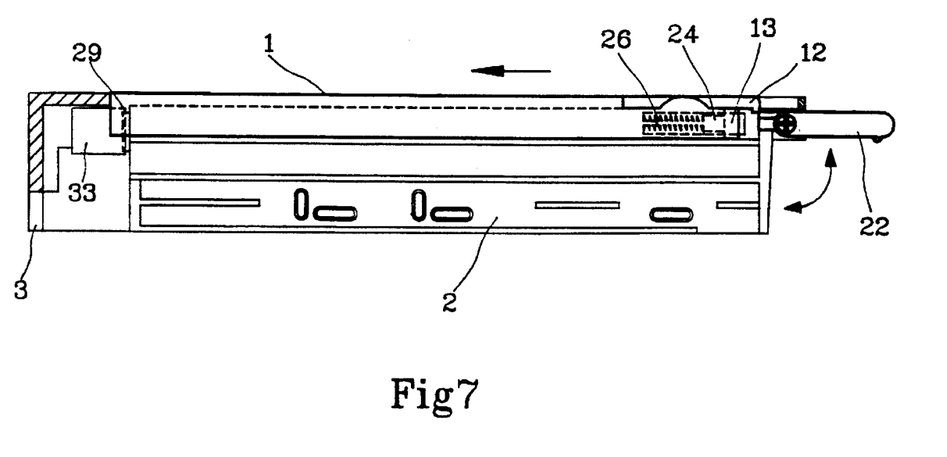
FIG. 7 is similar to FIG. 6 but showing the handle turned from the vertical position to the horizontal position and the projecting rods of the top cover forced out of the trapezoidal front openings on the casing.
Figure 8:
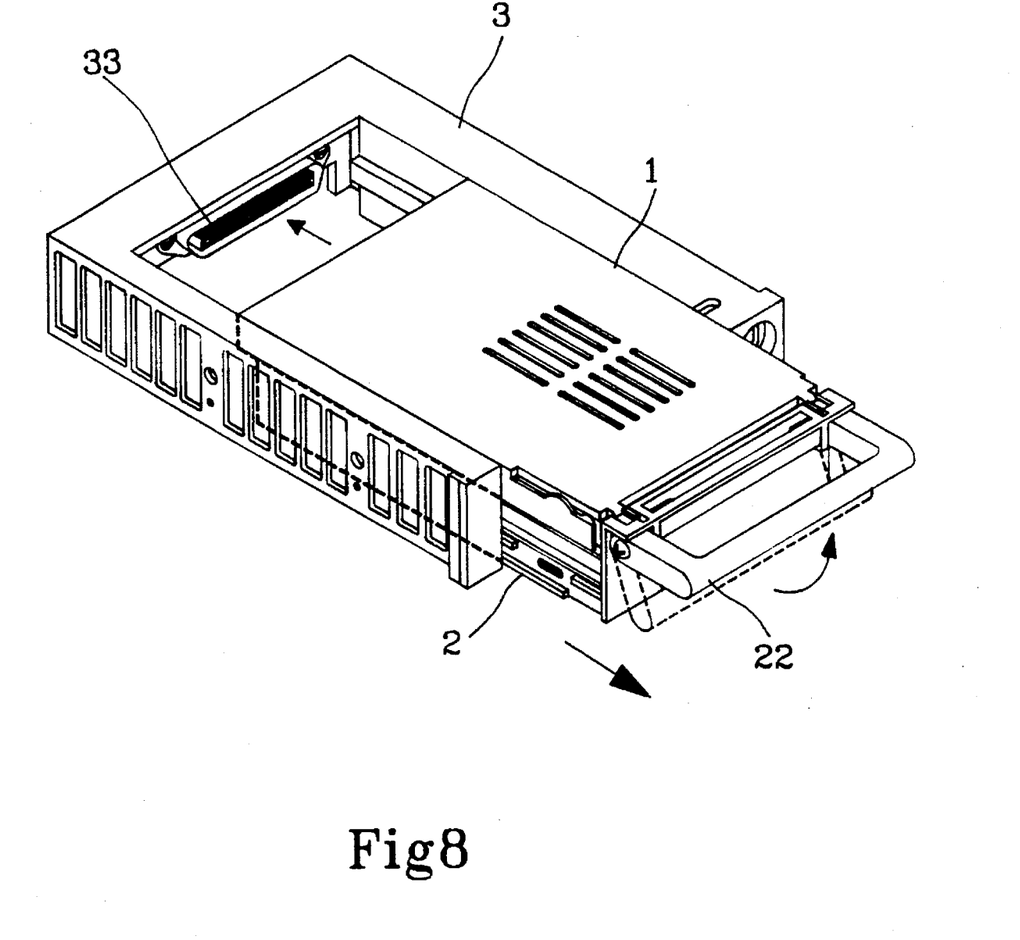
FIG. 8 is a perspective view of the present invention, showing the casing with the top cover pulled outwards from the mounting frame by the handle.
Figure 9:
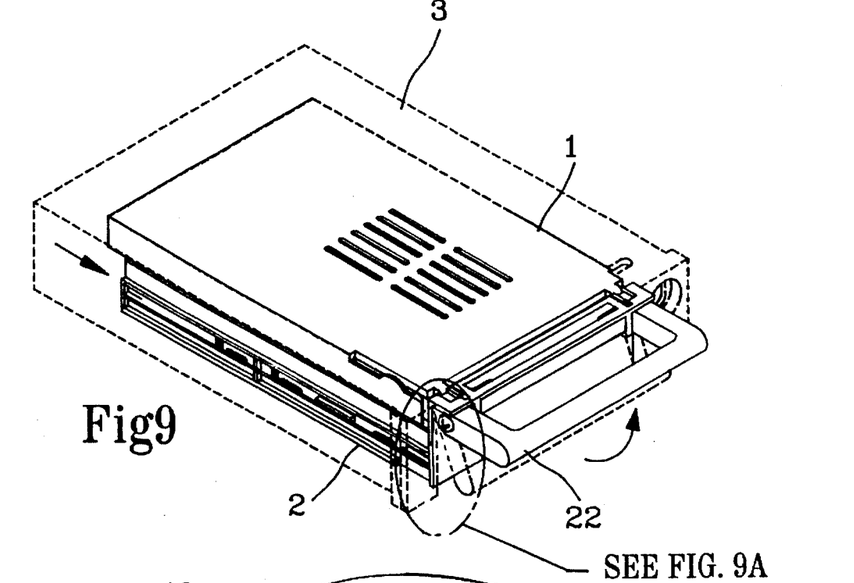
FIG. 9 shows the relative movement between the projecting rods on the top cover and the projecting blocks on the handle according to the present invention.
Figure 9A:
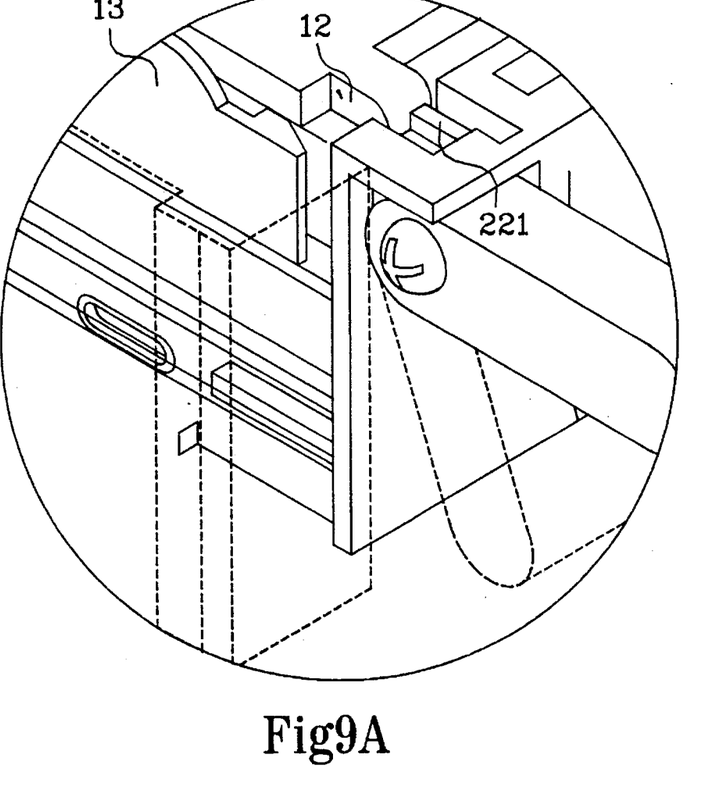

Referring to FIGS. 6, 7, and 8, when the handle 2 is turned upwards from the vertical position to the horizontal position, the projecting rods 12 of the top cover 1 are forced out of the front openings 21 of the casing 2 by the projecting blocks 221, causing the sliding block 24 moved backwards by the hook 13 to compress the spring 26, therefore the casing 2 is forced forwards relative to the mounting frame 3 to separate its electric connector 29 from the electric connector 32 of the mounting frame 3. When the electric connectors 29 and 32 are separated from each other, the handle 22 is returned from the horizontal position to the vertical position, the spring 26 forces the sliding block 24 to carry the top cover 1 back to its former position, therefore the projecting rods 12 of the top cover 1 are forced into the front openings 21 of the casing 2 again, and the casing 2 with the top cover 1 can be conveniently pulled out of the mounting frame 3 by hand through the handle 22.

It is to be understood that the drawings are designed for purposes of illustration only, and are not intended as a definition of the limits and scope of the invention disclosed.

We claim:

1. A drawer type hard diskdrive adapter comprising a mounting frame mounted within a slot on a computer mainframe and having an electric connector connected to the electric circuit of said computer mainframe and two longitudinal rails bilaterally disposed on the inside, a casing covered with a top cover and moved in and out of said mounting frame for holding a hard diskdrive, said casing having an electric connector for connecting the hard diskdrive therein to the electric connector on said mounting frame and two longitudinal grooves on two opposite lateral sides thereof matched with the longitudinal rails on said mounting frame, wherein said top cover is made of rectangular shape having two projecting rods bilaterally extended from a front side of a top wall thereof, a front hook extended from one side wall thereof, and two sliding grooves bilaterally disposed on the inside;

said casing is made of hollow rectangular shape having two symmetrical front openings bilaterally disposed at a front side thereof, which receive the front projecting rods of said top cover, two transverse screw holes respectively disposed adjacent to said front openings, a handle having two opposite ends pivotably connected to said screw holes by a respective screw bolt, a track at one lateral side thereof, a sliding block connected to the front hook of said top cover and moved in said track, and a spring connected between one end of said sliding block and one end of said track, said handle having two projecting blocks at two opposite ends moved to force the projecting rods of said top cover out of the front openings of said casing in separating said casing from said mounting frame.

2. The drawer type hard diskdrive adapter of claim 1 wherein said spring has one end fixed to a locating rod at one end of the track on said casing, and an opposite end fixed to one end of said sliding block, said sliding block being hooked by the front hook of said top cover for permitting said top cover to be moved relative to said casing within the limitation of the track on said casing.

3. The drawer type hard diskdrive adapter of claim 1 wherein said casing further comprises a plurality of smoothly curved raised portions on the two opposite lateral sides above the longitudinal grooves thereof for matching with the sliding grooves on said top cover respectively.

4. The drawer type hard diskdrive adapter of claim 1 wherein the front openings on said casing are respectively made of trapezoidal shape.

5. The drawer type hard diskdrive adapter of claim 1 wherein the projecting blocks of said handle are respectively inserted into the front openings on said casing to force the projecting rods of said top cover out of the front opening on said casing when said handle is turned upwards through 90° angle.

\* \* \* \* \*